March 24, 1959  M. A. COLER  2,879,234
THERMOPLASTIC RESIN PARTICLES COATED WITH CONDUCTIVE
GEL COMPOSITION AND METHOD OF MAKING SAME
Filed March 23, 1956

INVENTOR.
MYRON A. COLER
BY Leonard H. King
AGENT

United States Patent Office 2,879,234
Patented Mar. 24, 1959

2,879,234

THERMOPLASTIC RESIN PARTICLES COATED WITH CONDUCTIVE GEL COMPOSITION AND METHOD OF MAKING SAME

Myron A. Coler, Scarsdale, N.Y.

Application March 23, 1956, Serial No. 573,568

16 Claims. (Cl. 260—4)

This invention relates to electrically conductive plastic compositions and more particularly, to conductive plastic products of the type wherein electrical conductivity is attained by physically combining conductive gels with a plastic. The term "plastic" as used herein embraces any one of the large and varied group of materials commonly referred to as plastics and resins. The term "conductive gell" as used herein embraces non-fluid, coherent systems composed of an ionizable organic liquid medium, in continuous phase, and a supporting structure of colloidal or polymeric particles.

This invention is a continuation-in-part of my copending applications entitled "Conductive Plastic Product and Method of Making the Same," Serial Number 203,031, filed December 27, 1950, now U.S. Letters Patent 2,761,849, and "Conducting Gel Product and Method of Making Same," Serial Number 270,289, filed on or about February 6, 1952, abandoned in favor of the instant application.

In general, the conductive plastics of the present invention have electrical conductivities intermediate between those of the metals and those of untreated plastics. For example, a large group of conductive plastic products may be prepared in accordance with the present invention having resistivities of the order of $10^5$ to $10^{11}$ ohm-centimeters. Plastic compositions embodying the present invention are particularly useful in making anti-static molded plastic articles. Moreover, these plastic compositions may be used for a wide variety of other purposes where it is desirable or necessary to have a product which combines moderate conductivity with the desirable properties of the plastics, such as ease of fabrication into intricate shapes, good tensile and mechanical strength, and selected optical properties.

Conductive materials which are transparent and colorless are particularly useful in producing transparent and translucent electrically conductive plastics. Clear conductive materials occur most frequently as liquids rather than as metals or compounds of metals.

Prior efforts to produce electrically conductive articles wherein conductivity is attributable to the presence of conductive compounds which are normally liquid at molding temperatures have not been entirely successful, largely because of the limitations inherent in the previously proposed techniques. For example, if plastic particles are treated with a conductive compound that becomes fluid during molding, there results either a solution of the additive in the plastic or a dispersion of isolated liquid droplets in the plastic. In either case a material of comparatively low conductivity is produced.

It is, accordingly, an object of the present invention to provide an improved electrically conductive plastic.

It is another object of the invention to provide a conductive plastic product comprising a plastic and a normally liquid conductive compound, and having a high conductivity in relation to the amount of conductive compound incorporated in the product.

It is still another object of the invention to provide a conductive plastic product wherein the physical characteristics of the plastic are substantially unchanged.

It is a further object to provide a conductive plastic product which will retain anti-static properties for a relatively long time. It is still another object of the invention to provide a conductive plastic product having selected optical properties.

Other objects of the invention will be in part obvious and in part pointed out hereafter with particularity as the following description proceeds in conjunction with the accompanying drawing.

The method of the present invention is based on my discovery that by cladding the surfaces of comminuted plastic particles or pellets with a conductive gel and then molding the desired article from the coated particle the resulting article will have a surprisingly high conductivity in relation to the amount of conductive material incorporated therein; and thus by this technique, it is possible to produce conductive plastic products having relatively high conductivity coupled with molding characteristics and physical properties substantially the same as those of the untreated plastic. The quantity of conductive gel 4 applied is preferably such as to cover a major proportion of the surfaces of the plastic particles 2 in continuous phase so as to provide a molding product which may be formed by conventional compression molding techniques into any of various desired shapes.

Figure 1:
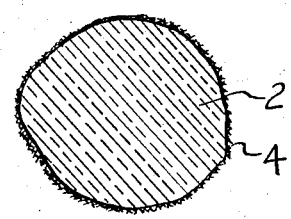
Figure 1 shows, greatly enlarged, in cross-section, a particle of a molding composition of this invention.
Figure 2:
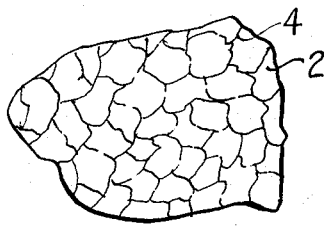
Figure 2 shows an enlarged section of a portion of a molded plastic body of this invention.

As shown in Figure 2, articles molded from the coated powders of the present invention are characterized by a reticulate structure of the conductive gel 4, that is, the articles are predominantly composed of the plastic 2 but have a fine, lacy network of conductive gel therein in a honeycomb structure that provides a multiplicity of conductive paths through the body of the plastic.

From an extended investigation of my invention I have determined that the desired modifications in the electrical properties of plastic articles produced in accordance with the invention are generally assured by controlling simultaneously two factors, i.e., an area factor $R_A$ and a volume factor $R_V$ which are defined as follows:

$$R_A = A_C/A_p$$

$$R_V = \frac{V_C}{V_p + V_C}$$

where $A_p$ = area of plastic powder surface
$A_C$ = area of plastic powder surface clad with conductive gel material
$V_p$ = volume of plastic powder
$V_C$ = volume of conductive gel Advantageously, $R_A$ should be in the range of about 0.55 to 1.00 while $R_V$ should be in the range of about 0.01 to 0.40. Preferably $R_A$ should be made to fall in the range of about 0.90 to 1.00 and $R_V$ in the range of about 0.02 to 0.30. In general, the quantity of conductive gel material applied to the plastic particles is between about 0.1 and 50% based on the weight of the plastic particles.

The product obtained from the coated molding powders of the present invention should not be confused with the familiar conductive rubber compositions and similar types wherein a large proportion of acetylene black or other conductive material is fully dispersed in a plastic binder by such techniques as mixing the conductive compound with a solution of the plastic. Where such complete dispersion of the conductive material in the plastic is effected, the particles of conductive material become imbedded in the plastic, and therefore a relatively large amount of conductive material must be used to obtain sufficient contact between the particles thereof to secure the desired conductivity. It is to be noted that it is well known that even highly conductive materials such as copper powder may be dispersed in plastic materials in high loadings and yet the resultant product will have conductivity so low that it is useful for dielectric applications. With the present process, on the other hand, it is possible to achieve useful conductivity with a relatively small proportion of conductive material and the material need not be highly conductive. From a practical standpoint, the relatively high loading of conductive material utilized in the dispersion methods is undesirable since it produces structural weaknesses such as excessive friability and fabricating difficulties; and, in general, an undesirable departure from the physical properties of the untreated plastic will result.

In carrying out this invention the conductive material need not be compatible with the plastic or easily wet by it; in fact, it is preferred that the two materials be mutually repellent so that there is no loss of conductivity because particles or droplets of the conductive gel are surrounded by plastic.

Inherent in the teachings of this invention is the efficient utilization of the conductive material incorporated into the conductive plastic product. This efficiency permits the commercial use of expensive conductive materials; further, the relatively small quantity of conductive material required and the method of incorporation does not undesirably alter the physical properties of the plastic.

The quantity and nature of the conductive cladding on the plastic particles are such that a material improvement in the electrical conductivity of the plastic base is effected without destroying the moldability of the powder. Various theories might be advanced to explain the unexpected phenomenon that plastic particles coated with a conductive gel can still be successively molded into desired products which exhibit a combination of selected characteristics of plastics and conductors. Suffice it to say, however, that it is only necessary to follow the teachings of this invention; the optimum quantity of any given conductive gel for any selected plastic to achieve a desired final result in terms of molded products is determinable by simple preliminary experimentation.

The resin or plastic powder which can be treated by the process of this invention may be chosen from a large group of molding substances including thermosetting materials like phenolics and urea-formaldehyde plastics and thermoplastic materials like polyamide, polyvinylchloride, polyvinylidene chloride, polystyrene, poly methylmethacrylate, vinyl copolymers, cellulose acetate, etc. The plastic particles may already contain compounding ingredients such as lubricants, plasticizers, dyes, pigments and fillers, like alpha-cellulose, wood flour and mica.

Any of various conductive gels can be used in carrying out the process. As indicated in the specific examples given hereafter, the conductivity obtained by using the present method varies appreciably depending upon the type of conductive material used in the gel. However, in all cases, the conductivity obtained with a given type and quantity of conductive material is substantially greater when using the present method than when using familiar dispersion methods wherein the conductive material is dispersed in the plastic.

A suitable conductive gel fulfills the following requirements:

(1) Conductivity in the mass.
(2) Good coating characteristics, and
(3) Ability to withstand molding conditions.

Many materials are suitable for use as the gelling agent for the conductive gel including carboxy methyl cellulose, basic casein gel, gelatin gel and the systems disclosed in the examples.

Gels based on inorganic systems such as hydrated or polymerized silicate gel or oxides are also suitable. Natural and synthetic latexes and emulsions of polymeric material which pass through a gel stage during drying can also be used.

It is well known that emulsions and latexes in general may be converted to a gel form by partial drying or adding reagents which will negate the influence of the dispersing agent, often by a change in pH.

Materials suitable as the conductive component for the described gels include formamide which is disclosed and claimed as a conductive material in copending application of Arnold S. Louis for "Electrically Conductive Coating Material," Serial No. 245,763. In general, suitable materials include ionizable organic compounds and mixtures. The conductivity of such ionizable organic compounds or even of ionizable impurities which may be present can be enhanced by the addition of materials having a high dielectric constant. It is recognized that the presence of water in the gels described herein may contribute appreciably to conductivity. Likewise, ionizable inorganic salts, present as impurities or deliberately added, may enhance conductivity.

I have found that effective cladding of the comminuted particles of most plastics can be achieved by introducing them into the solution from which the gel is formed so that the solidified gel forms on the surfaces upon removal of excess solvent. Another effective method for cladding comminuted particles of plastic is to first form a gel or an emulsion of a gel-forming material including the desired electrically conductive material. This gel or emulsion is spread out on a suitable drying tray and allowed to solidify to an extent where it can be ground to a fine powder but retains its conductive properties. An appropriate method of performing this size reduction is the well known technique of cooling with liquid nitrogen during the grinding process.

Finely divided material prepared as described in the preceding paragraph may be applied to the surfaces of the comminuted plastics in any of various ways but I prefer to use what might be designated as a simple "smearing" technique. I have found that effective cladding of the comminuted particles of most plastics can be achieved by carefully tumbling and/or ball milling the two powders in physical contact with one another. Adhesion promoting conditions, including moderate heating where the plastic is thermoplastic, wetting the surface of the plastic particles with a suitable solvent to increase its tackiness, and the like, may be used if desired. It is important that the plastic should not be in a condition to encase the conductive particles and therefore I prefer, where possible, to use a simple mechanical action such as tumbling or ball milling, subject to the conditions pointed out hereinafter, at room temperature to clad the plastic particles with the finely divided sorbant material.

The term "ball milling" is used herein in its generic sense to include any milling process carried out in a rotating shell containing the material to be milled and discrete inert particles that assist in the milling operation. The discrete articles are usually steel spheres, but may also have other shapes and be made of other inert materials. Moreover, it should be noted that in the present process, the materials are preferably subjected to only a moderate ball milling, that is, the ball milling is carried out in such a way that aggregates of the conductive compound are broken up to thus produce the desired coating of the conductive gel on the plastic particle, but the milling is not carried out under conditions which would favor the fracture of the plastic particles.

In order to point out more fully the nature of the present invention, the following specific examples are given of illustrative methods of preparing the conductive plastic products falling within the scope of the present invention.

Example 1

10 grams of polyvinyl-alcohol, 90 grams of water and 10 grams of glycerol were stirred together in a 500 cc. glass beaker. To this solution were added 200 grams of approximately 20 mesh polystyrene beads. The beads were then dried on a steam bath in order to have a coating of the polyvinyl-alcohol/glycerol mixture form on the beads.

The coated beads were compression molded at 350° F. for 10 minutes at 10,000 p.s.i. and cooled under pressure. The resulting molded product was translucent and had a specific resistance of about $7 \times 10^5$ ohm-centimeters at 20° C.

Example 2

The procedure of Example 1 was repeated utilizing 10 grams of formamide in place of the glycerol.

Optically, the resulting molded product was translucent to transparent depending on thickness, and discharged an electroscope readily.

Example 3

The procedure of Example 1 was repeated utilizing 10 grams of N-acetylethanolamine.

Optically, the resulting molded product was translucent to transparent depending on thickness and did not attract crushed cigarette ashes after being rubbed vigorous-up with a wool cloth.

Example 4

The procedure of Example 1 was repeated with 1 gram of dimethylol urea and 10 grams of formamide substituted for the glycerol.

The resultant molded product was translucent and had a specified resistance of about $10^5$ ohm-centimeters at 20° C.

Example 5

20 parts of a 10% solution of polyvinyl-alcohol in water, 10 parts of formamide, 10 parts of GRS–4 latex, and 12 parts of water were mixed. To the mixture were added 50 parts of polystyrene beads. The excess was drained and the beads were dried and molded as in Example 1. The product was translucent and dissipated static readily.

The GRS–4 rubber latex is derived from the emulsion polymerization of a formula containing approximately equal parts by weight of butadiene and styrene, which contains no antioxidant or shortstop and which contains 37% to 39% of total solids.

Example 6

Example 1 was repeated using 10 grams of carboxy methyl cellulose instead of the polyvinyl-alcohol. The resulting molding was translucent and had a specific resistivity of about $10^6$ ohm-centimeters.

Example 7

Example 1 was repeated using 200 grams of 60 mesh polyvinylchloride instead of the polystyrene beads. The resultant molding dissipated static readily.

Example 8

The experiment of Example 3 was repeated except that 200 grams of 40 mesh polymethylmethacrylate were substituted for the polystyrene beads. The resultant molding dissipated static.

Example 9

The experiment of Example 3 was repeated except that 200 grams of 40 mesh polyvinylidene chloride were substituted for the polystyrene beads. The resulting molding did not acquire a static charge when rubber vigorously with a wool cloth.

Example 10

200 grams of 60 mesh polyvinylchloride and 200 grams of an ammoniacal casein emulsion containing 10% solids and 2 grams of formamide were charged to a sigma blade mixer. With the mixer in operation, dilute sulfuric acid was slowly added to the mixture until visual examination and an increase in the power consumption of the mixer revealed that gelation had taken place. The mixture was transferred to a drying oven where with frequent agitation, approximately three quarters of the water present was removed. The resulting substantially dry, gel-coated particles were compression molded under standard conditions for polyvinylchloride. The resulting moldings would not acquire a static charge where rubber with a wool cloth.

Example 11

200 grams of 20 mesh polystyrene beads were charged to a sigma blade mixer. 200 grams of a hot 5% solution in water gelatin, U.S.P. grade, and 2 grams of N-acetyl ethanolamine was prepared. The hot gelatin solution was poured into the mixer and agitation immediately started. As the mixer cooled, a gelation took place. The gelled mixture was transferred to a vacuum oven when further drying took place with frequent agitation until approximately 75% of the water present had been removed. The resulting substantially dry, gel-coated particles were compression molded under standard conditions for polystyrene. The resultant moldings were destaticized.

Example 12

200 grams of 20 mesh polystyrene beads, 2 grams of N-acetyl ethanolamine and 50 grams of a Hevea rubber latex containing 30% solids were charged to a sigma blade mixer wherein the mixture was agitated and coagulated substantially as in Example 10. The coagulated material was further dried to remove about 80% of the initial water.

The resulting coated plastic particles gave molding which did not acquire a static charge when rubbed with a wool cloth.

Example 13

Example 12 was repeated using a 50 grams emulsion of GRS–4 rubber latex instead of the natural rubber latex. Results were substantially similar to those of Example 12.

The GRS–4 rubber latex is derived from the emulsion polymerization of a formula containing approximately equal parts of weight of butadiene and styrene, which contains no anti-oxidant or shortstop and which contains 37% to 39% of total solids.

Example 14

200 grams of 40 mesh polymethylmethacrylate chips were charged to a sigma blade mixer equipped with a heating jacket and a vacuum chamber covering the mixer body. 25 grams of a polystyrene emulsion prepared by using potassium persulfate as both catalyst and dispersant, containing 30% and 1 gram of N-acetyl ethanolamine were added. The agitator was set in motion vacuum applied and evaporation carried out at 70° C. When approximately 25% of the water had been removed, the power consumption of the motor increased noticeably, indicating that gelation was taking place. Evaporation was continued until half of the water had been removed. Microscopic examination of the resulting particulate material showed that the previously angular plastic particles had become more rounded and coated with whitish gel material. Moldings were made from this product and destaticized.

Example 15

The procedure of Example 14 was repeated using 25 grams of a 50% solids emulsion of polyvinyl acetate stabilized with 3% of polyvinyl alcohol in place of the polystyrene emulsion. In this case gelation again occurred when about 25% of the water had been removed and evaporation was stopped shortly thereafter. Results were substantially as in Example 14.

*Example 16*

The procedure of Example 14 was repeated using 25 grams of a 40% solids emulsion of polymethylmethacrylate stabilized with 1% of potassium stearate in place of the polystyrene emulsion. In this case, gelation occurred after about 35% of the water had been evaporated and evaporation was stopped shortly thereafter. Molding made from the resulting product was destaticized.

*Example 17*

One liter of a water solution of aluminum sulfate containing 57 grams of $Al_2(SO_4)_3$ was heated to 100° C. To this was slowly added 2 liters of a water solution of ammonium hydroxide containing 210 grams of $2N-NH_4OH$. A heavy gelatinous precipitate was formed. The gel suspension was filtered on a Büchner funnel and washed with 500 cc. of water. Half of the filter cake was charged with 400 grams of 20 mesh polystyrene beads and 4 grams of N-acetyl ethanolamine to the vacuum mixer of Example 14 where evaporation was carried out with agitation at 70° C. until most of the water had been removed. Analysis of the product showed the presence of about 10 grams of water in the total mass, as determined by toluene distillation. Moldings made from the product of the above process were destaticized.

*Example 18*

200 grams of 60 mesh polymethylmethacrylate chips were uniformly coated with 20 ml. of sodium silicate solution having a specific gravity of 1.185. The nearly dry mass was agitated with 20 ml. of 10% hydrochloric acid which was added. The seemingly dry coated particles were placed on a Büchner funnel and washed with water until almost no chloride was found in the wash water. Four grams of N-acetyl ethanolamine were throughly mixed with the finally resulting granules by tumbling and the granules were finally dried in an oven at 95° C. Moldings made from the resulting product did not acquire a charge when rubbed with a wool cloth.

*Example 19*

The procedure of Example 18 was repeated except that 15 ml. of a water solution of aluminum chloride containing 2.4 grams of $AlCl_3$ were used instead of the hydrochloric acid.

The resulting polymethylmethacrylate particles coated with hydrous aluminum silicate gel, carrying N-acetyl ethanolamine yielded moldings which were destaticized.

It is to be observed that the molding powders of this invention, when subjected to the molding conditions indicated in the above examples to form molded articles substantially free from voids and possessing the above described reticulate structure, undergo substantial plastic deformation. It is hardly obvious that a thin coating on the surface of plastic particles should resist such great deformation without destruction of the coating and consequent loss of conductivity. Nevertheless, the coatings do, in fact, resist that deformation.

It will be appreciated that molding powders treated in accordance with the present invention are preferably utilized in compression molding but may also be advantageously utilized in injection and extrusion molding operations. It should be noted that when the molding powders are to be injection or extrusion molded a somewhat higher proportion of conductive material should be incorporated in the conductive gel than is necessary for compression molding.

In the present application and particularly in the appended claims, the phrase "plastic in comminuted form" is used. It should be noted that the word "comminuted" merely indicates that the plastic is in a discrete particulate form and does not necessarily imply that this particulate form was arrived at by subdivision of larger plastic masses.

Since many embodiments might be made of the present invention and since many changes might be made in the embodiment disclosed herein, it is to be understood that the foregoing description is to be interpreted as illustrative only and not in a limiting sense.

What is claimed is:

1. The process of producing a product adapted for molding destaticized articles, comprising coating a major proportion of the surfaces of particles of a synthetic resinous organic thermoplastic molding polymer with a conductive gel composition, said conductive gel composition consisting of a gel selected from the group consisting of carboxy methyl cellulose gel, casein gel, gelatin gel, hydrated silicate gel, hydrated aluminum oxide gel, natural rubber latex gel and synthetic polymeric resin gel and an ionizable organic compound possessing an electrical conductivity equal at least to that of glycerol, said conductive gel composition being characterized by conductivity in the mass, good polymer particle coating characteristics, and ability to withstand normal molding conditions for said polymer, the quantity of said conductive gel composition being from 0.1% to 50% of the weight of said polymer, and being at least sufficient to coat a major proportion of the surfaces of said particles, said ionizable organic compound being present in a quantity sufficient to impart an electrical conductivity to articles molded from said resultant product whereby they are incapable of becoming electrostatically charged, said polymer, said gel and said ionizable organic compound being mutually non-reactive and stable under normal molding conditions for said polymer.

2. The process of claim 1 wherein said ionizable organic compound is selected from the group consisting of formamide, glycerol, N-acetyl ethanolamine and dimethylol-urea.

3. The process of claim 1 wherein said polymer is polystyrene.

4. The process of claim 1 wherein said polymer is polymethylmethacrylate.

5. The process of claim 1 wherein said polymer is polyvinylidene chloride.

6. The process of claim 1 wherein said coating is accomplished by tumbling particles of said conductive gel composition and particles of said polymer until the major proportion of the surfaces of said polymer are coated with said gel composition.

7. A destaticized molded article which consists essentially of a synthetic resinous organic thermoplastic polymer body and a conductive gel composition present as a reticulated structure extending continuously through said body, said conductive gel composition consisting of a gel selected from the group consisting of carboxy methyl cellulose gel, casein gel, gelatin gel, hydrated silicate gel, hydrated aluminum oxide gel, natural rubber latex gel, and synthetic polymeric resin gel and sufficient ionizable organic compound to render said molded article substantially incapable of becoming electrostatically charged, said polymer, said gel and said ionizable organic compound being mutually non-reactive and stable under said normal molding conditions for said polymer and said ionizable organic compound possessing an electrical conductivity of at least the conductivity of glycerol, said conductive gel composition comprising between 0.1% and 50% by weight based on the weight of the polymer, said article having been produced by molding under heat and pressure, the product formed by the process of claim 1.

8. The product of claim 7 wherein said polymer is polystyrene.

9. The product of claim 7 wherein said polymer is polymethylmethacrylate.

10. The product of claim 7 wherein said polymer is polyvinylchloride.

11. The product of claim 7 wherein said ionizable organic compound is selected from the group consisting of formamide, glycerol, N-acetyl ethanolamine and dimethylol-urea.

12. A product adapted for molding destaticized articles, consisting essentially of a resinous synthetic organic thermoplastic molding polymer in comminuted form and about 0.1% to 50% of a conductive gel composition based on the weight of said polymer wherein said gel is selected from the group consisting of carboxy methyl cellulose gel, casein gel, gelatin gel, hydrated silicate gel, hydrated aluminum oxide gel, natural rubber latex gel and synthetic polymeric resin gel, said conductive gel composition being characterized by conductivity in the mass, good polymer particle coating characteristic and ability to withstand normal molding conditions for said polymer, said gel composition being attached to the surfaces of the particles of said polymer and covering a major proportion of said surfaces to coat the same, said coated particles being plastically deformable to permit molding under the usual molding compositions for the polymer used, said conductive gel composition consisting of a gel and an ionizable organic compound possessing an electrical conductivity at least equal to that of glycerol and present in an amount sufficient to impart an electrical conductivity to said molded articles whereby they are incapable of becoming electrostatically charged, said polymer, said gel and said ionizable organic compound being mutually non-reactive and stable under said normal molding conditions for said polymer.

13. The product of claim 12 wherein said polymer is polystyrene.

14. The product of claim 12 wherein said polymer is polymethymethacrylate.

15. The product of claim 12 wherein said polymer is polyvinylidene chloride.

16. The product of claim 12 wherein said ionizable organic compound is selected from the group consisting of formamide, glycerol, N-acetyl ethanolamine and dimethylol-urea.

References Cited in the file of this patent

UNITED STATES PATENTS 2,592,147    Ikeda ------------------ Apr. 8, 1952